United States Patent
Bhogal et al.

(10) Patent No.: US 9,288,654 B2
(45) Date of Patent: Mar. 15, 2016

(54) KEEPING CONVERSATIONS CONFIDENTIAL

(75) Inventors: Kulvir Singh Bhogal, Pflugerville, TX (US); Robert Ross Peterson, Austin, TX (US); Lisa Anne Seacat, San Francisco, CA (US); Mark William Talbot, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 12/140,053

(22) Filed: Jun. 16, 2008

(65) Prior Publication Data

US 2009/0313351 A1    Dec. 17, 2009

(51) Int. Cl.
    G06F 15/16    (2006.01)
    H04M 1/66    (2006.01)
    H04W 4/24    (2009.01)
    H04M 15/00    (2006.01)
    H04W 12/02    (2009.01)

(52) U.S. Cl.
    CPC ............. *H04W 4/24* (2013.01); *H04M 15/00* (2013.01); *H04M 15/41* (2013.01); *H04M 15/43* (2013.01); *H04M 15/44* (2013.01); *H04M 15/745* (2013.01); *H04W 12/02* (2013.01); *H04M 2215/0104* (2013.01); *H04M 2215/0108* (2013.01); *H04M 2215/0164* (2013.01); *H04M 2215/0168* (2013.01)

(58) Field of Classification Search
    USPC .......................................... 709/217, 218, 219
    See application file for complete search history.

(56) References Cited

U.S. PATENT DOCUMENTS

| | | | | |
|---|---|---|---|---|
| 5,943,406 A | * | 8/1999 | Leta ...................... | H04M 15/00 379/111 |
| 6,011,837 A | * | 1/2000 | Malik .................... | H04M 15/00 379/111 |
| 6,792,089 B2 | * | 9/2004 | Tiliks .................... | H04M 15/00 379/114.28 |
| 6,983,370 B2 | * | 1/2006 | Eaton et al. .................... | 713/182 |
| 7,266,185 B2 | * | 9/2007 | Trandal et al. ........... | 379/142.02 |
| 7,466,808 B2 | * | 12/2008 | Benco ................... | H04M 15/00 379/119 |
| 7,743,247 B1 | * | 6/2010 | Horgan et al. ................ | 713/155 |
| 7,746,994 B1 | * | 6/2010 | Sanchez .................... | 379/201.01 |
| 7,839,987 B1 | * | 11/2010 | Kirchhoff et al. ......... | 379/142.02 |
| 2002/0019223 A1 | * | 2/2002 | Lee et al. ....................... | 455/411 |
| 2002/0029246 A1 | * | 3/2002 | Kumagai ........ | H04M 1/274583 709/205 |
| 2004/0058672 A1 | | 3/2004 | Lee et al. | |
| 2005/0004928 A1 | * | 1/2005 | Hamer et al. ................. | 707/100 |
| 2005/0047562 A1 | * | 3/2005 | Holz et al. .................. | 379/88.22 |
| 2005/0086138 A1 | * | 4/2005 | Prange ............................ | 705/34 |
| 2005/0170817 A1 | | 8/2005 | Matsutaka | |
| 2005/0221804 A1 | * | 10/2005 | Benco ..................... | H04M 1/56 455/414.1 |
| 2006/0115060 A1 | * | 6/2006 | Benco ................... | H04M 15/00 379/114.01 |
| 2008/0181199 A1 | * | 7/2008 | Madanes et al. .............. | 370/352 |
| 2009/0240597 A1 | * | 9/2009 | Oswald .......................... | 705/26 |

* cited by examiner

*Primary Examiner* — Aftab N. Khan
(74) *Attorney, Agent, or Firm* — Mollborn Patents, Inc.; Fredrik Mollborn

(57) ABSTRACT

Methods and apparatus, including computer program products, implementing and using techniques for keeping confidential records pertaining to selected communications made with a communication device. A user input is received designating one or more contacts with whom communications made with the communication device are to remain confidential. Information about the designated one or more contacts is transmitted to a server which stores records pertaining to communications made with the communication device. A statement is generated for the communications made with the communication device based on information stored on the server. Records pertaining to communications that are to remain confidential are displayed as an alias on the statement.

12 Claims, 3 Drawing Sheets

| Number | Start time | End time | Total Minutes |
|---|---|---|---|
| 555-555-0000 | 8:30 PM | 8:55 PM | 25 Minutes |
| 555-555-2222 | 9:00 PM | 9:15 PM | 15 minutes |
|  |  |  |  |
|  |  |  |  |

FIG. 3A

| Number | Start time | End time | Total Minutes |
|---|---|---|---|
| 555-555-0000 | 8:30 PM | 8:55 PM | 25 Minutes |
| 555-555-0000 | 9:00 PM | 9:15 PM | 15 minutes |
|  |  |  |  |
|  |  |  |  |

FIG. 3B

| Number | Start time | End time | Total Minutes |
|---|---|---|---|
| 555-555-0000 | 8:30 PM | 8:55 PM | 25 Minutes |
| *** Private*** | 9:00 PM | 9:15 PM | 15 minutes |
|  |  |  |  |
|  |  |  |  |

FIG. 3C

KEEPING CONVERSATIONS CONFIDENTIAL

BACKGROUND

This invention relates to mobile telephones and similar communication devices. Mobile telephones are widely used across the world today, not only to make phone calls to other mobile phones or to landline phones, but also to send and receive e-mails and SMS (Short Message Service) messages. There is a variety tariff models for paying for mobile telephone services. For example, some systems of payment are 'pay-as-you-go' (also known as pre-pay), where conversation time is purchased, for example, through an Internet account or in shops or vending machines, and added to a particular mobile telephone. Other systems, which are currently among the more common ones in the United States, use contract-based plans, where the user typically signs up for a certain number of minutes and/or a certain amount of data transfer over a predetermined time period.

Typically, in these contract-based plans, the user receives a monthly detailed statement or bill in the mail (or through e-mail, or by logging into an Internet account for the telephone service provider). The statement typically lists what calls and data transfers (such as SMS messages) were made from (or received by) the user's mobile telephone, the times of day when the calls were made/received, to whom the calls were made (or from whom the calls were received), and the duration of each call (or size of each data transfer).

There are situations in which a user might want to keep certain calls, emails, or SMS messages confidential, so that other people who are able to view the monthly statement would not be able to discern to whom the calls were made or to whom the SMS messages were sent/received. Some telephone service providers allow users to completely turn off logging of telephone calls and messages. However, there are currently no ways for a user to selectively turn off logging for a particular contact or telephone number. Thus it would be desirable to have more fine grained techniques for keeping particular conversations or data transfers confidential.

SUMMARY

In general, in one aspect, the invention provides methods and apparatus, including computer program products, implementing and using techniques for keeping confidential records pertaining to selected communications made with a communication device. A user input is received designating one or more contacts with whom communications made with the communication device are to remain confidential. Information about the designated one or more contacts is transmitted to a server which stores records pertaining to communications made with the communication device. A statement is generated for the communications made with the communication device based on information stored on the server. Records pertaining to communications that are to remain confidential are displayed as an alias on the statement.

The invention can be implemented to include one or more of the following advantages. A user can designate individual telephone numbers or groups of numbers to prevent them from showing up on the detailed billing statements, thereby increasing the privacy for mobile telephone users. This can be done, for example, by combining a record designated as private with a previous telephone call record, by marking the record as "private" on the billing statement, or by assigning an alias to the private record. In some embodiments, e-mails or SMS messages originating from (or being sent to) the telephone numbers or to e-mail addresses associated with these telephone numbers can be automatically deleted from the user's mobile telephone, if so desired.

The details of one or more embodiments of the invention are set forth in the accompanying drawings and the description below. Other features and advantages of the invention will be apparent from the description and drawings, and from the claims.

DESCRIPTION OF DRAWINGS

FIGS. 3A-3C show exemplary detailed billing statements, in accordance with various embodiments of the invention.

Like reference symbols in the various drawings indicate like elements.

DETAILED DESCRIPTION

Overview

Figure 1:
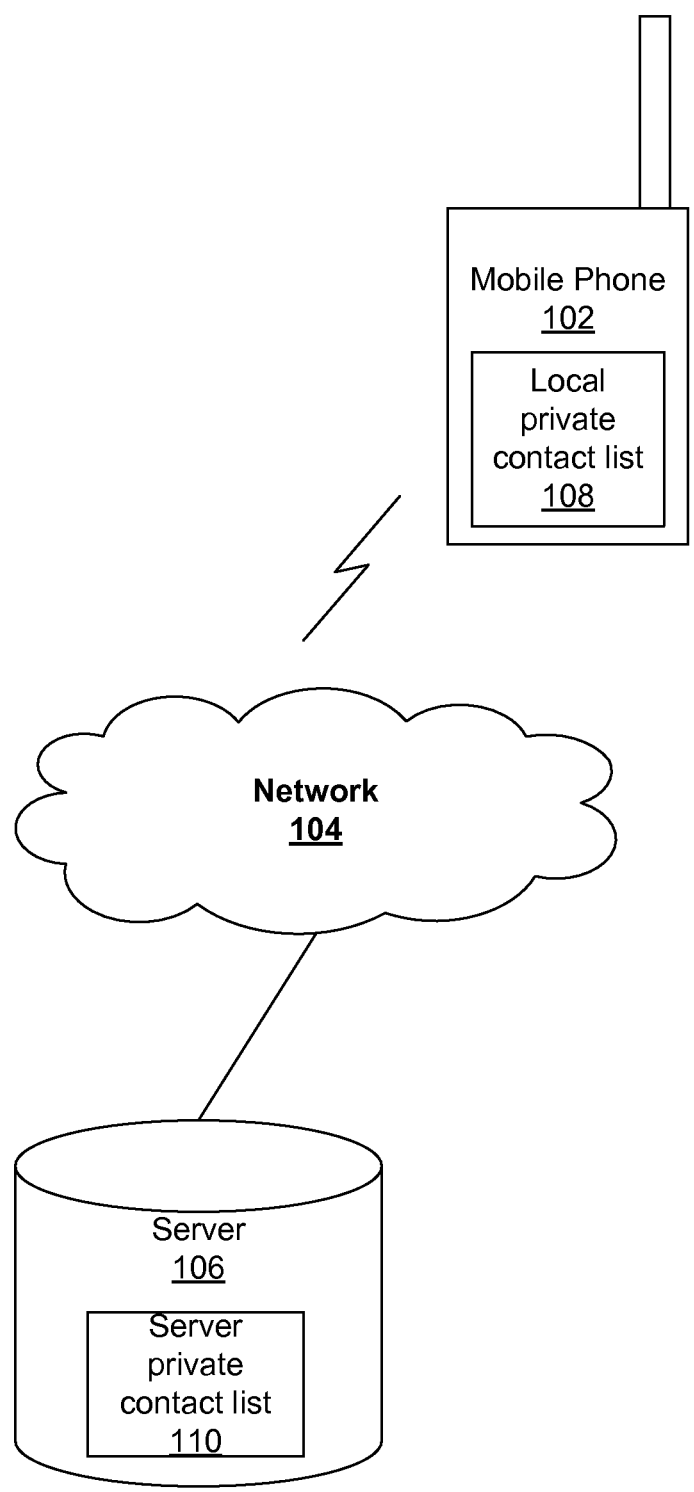
FIG. 1 shows a schematic view of a system including a mobile telephone, a network, and a server, in accordance with one embodiment of the invention.

The various embodiments of the invention described herein pertain to techniques for improving the privacy of mobile telephone users. In particular, the various embodiments of the invention relate to techniques for preventing logging and tracking of individual conversations or SMS or e-mail messages sent to (or received from) select users. As will be discussed in further detail below, in some embodiments, this can be done by adding a "make correspondent private" checkbox for each contact in a mobile telephone's list of contacts. When the box is checked by a user, none of the missed or dialed calls to or from that contact are logged. In some embodiments, after an e-mail, SMS message or other form of communication from such a contact has been read, the e-mail or SMS message is deleted. The mobile telephone's list of contacts is subsequently synchronized with a contact list on the billing server, and communications with the private contacts on the billing server are not logged for detailed billing purposes.

Compared to existing methods, this allows a user to receive a statement where certain communications are visible and others are marked as private (or otherwise made not identifiable). That is, a much more fine-grained level of privacy control can be achieved using the various embodiments of this invention compared to conventional systems used today.

Various embodiments of the invention will now be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 shows a schematic view of a system (100) including a mobile telephone (102), a network (104), and a server (106), in accordance with one embodiment of the invention. It should be noted that only a single mobile telephone (102) and a single server (106) are illustrated in FIG. 1 for ease of understanding the invention. As the skilled reader realizes, in a real-world scenario there will be a large number of mobile telephones (102) and servers (106) connected to the network (104).

As was discussed above, the mobile telephone (102) includes a local private contact list (108). The local private contact list (108) includes the names of one or more users, typically identified by telephone numbers or e-mail addresses, with whom the owner of the mobile telephone would like to keep the communications confidential. Typically, the local private contact list (108) is a subset of a general contact list (not shown) in the mobile telephone, where the user has identified some contacts as being "private."

A corresponding server private contact list (110) is associated with the mobile telephone (102) and is located at the server (106), which is typically hosted by a mobile telephone service provider. The server private contact list on the server is used by the telephone service provider when generating detailed monthly billing statements that are sent to the owner of the mobile telephone (102), as will be discussed in further detail below. When the mobile telephone (102) is connected to the network (104), the information in the local private contact list (108) and the server private contact list (110) can be synchronized, using methods that are well known to those of ordinary skill in the art, so that the information contained in the local private contact list (108) and in the server private contact list (110) is identical. The details of how the system (100) operates to keep certain communications confidential will now be described in further detail with reference to the flowchart of FIG. 2, which shows a process (200) for keeping communications confidential, in accordance with one embodiment of the invention.

Figure 2:
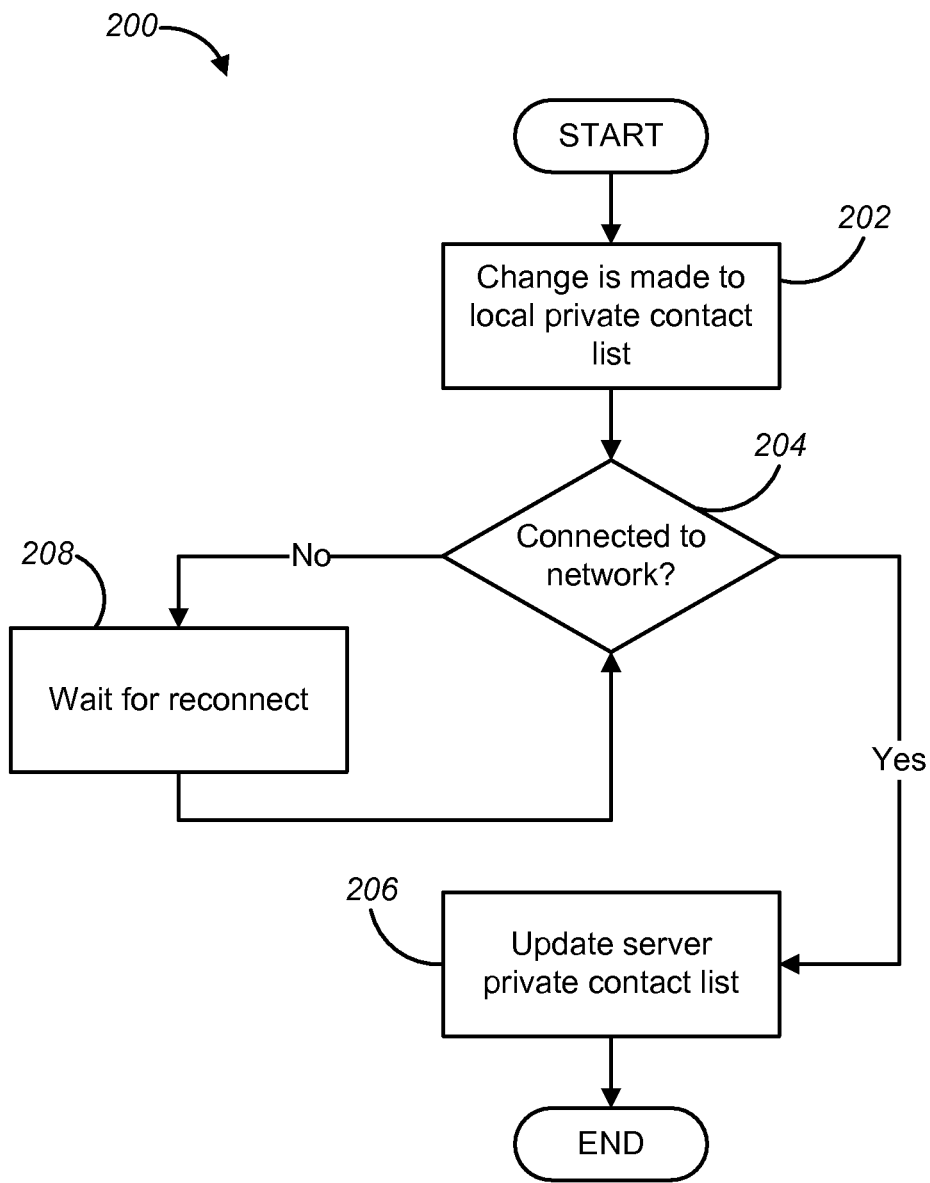
FIG. 2 shows a process for keeping communications confidential, in accordance with one embodiment of the invention.

As shown in FIG. 2, the process (200) begins by a user making a change to his local private contact list (108) (step 102). This can be, for example, adding a new contact to his local contact list and marking the contact as "private," or simply just marking an existing contact in the local contact list to be marked as "private" for all future communications. This can be done in a variety of ways, for example, through different menus, checkboxes, or radio buttons on a user interface in the mobile telephone, as is familiar to those of ordinary skill in the art.

Next, the process determines whether the mobile telephone (102) is connected the network (104) (step 204). If it is determined that the mobile telephone is connected to the network (104), the server private content list (110) is synchronized with the local private contact list (108) in the mobile telephone (102) (step 206), and the process ends. If it is determined in step 204 that the mobile telephone (102) is not connected to the network (104), the mobile telephone waits for the network (104) to become available (step 208), and when the network (104) becomes available, steps 204 and 206 are executed, as described above.

Subsequently, when the telephone service provider generates a detailed billing statement to be sent to the user, the contact information to be put on the billing statement is first checked against the server private contact list (110) for the user. Any entry that involves a "private contact" from the server private contact list (110) receives special treatment on the detailed billing statement. This special treatment can be done in a variety ways, some of which will be described in further detail below with reference to FIGS. 3A-3C.

As can be seen in FIG. 3A, in one embodiment, a detailed billing statement has an associated alias for each private contact. So whenever a call, an SMS message, or any other form of communication is made with the private contact, the billing information shows the details for the alias in the billing information. For example, if Jane Doe with telephone number 555-555-1111 is a private contact, she may have a public alias, Joe Smith with telephone number 555-555-2222. That is, a 15 minute phone call made at 9:00 PM to Jane Doe would show up as the second entry in FIG. 3A.

In another embodiment, the time billed to the private contacts can be merged with the time billed to the previous phone call (or SMS message). This is illustrated in FIG. 3B, where the 9:00 PM phone call to Jane Doe shows up as another call made to the previous telephone number.

In yet another embodiment, illustrated in FIG. 3C, the private contacts are simply marked as "*PRIVATE*" on the detailed billing statements. As the skilled reader realizes, there is a whole range of different options for how private calls can be marked on the billing statement, and these are merely a few of them.

In some embodiments, users can log in to view an online version of their billing statement, similar to conventional systems. In these embodiments, however, different rights can be associated with the different identities of the users who log in to view the statements. For example, if the user who designated the contacts as being private logs in to view her own billing statement, she will see an unmodified version of the billing statement, where all contact records are listed with their true identities. On the other hand, if another person who has access to the billing statements—but who did not designate the contacts as private—logs in, then that person will see an altered version of the billing statement, as described above.

The flowchart and block diagrams in the figures referred to above illustrate the architecture, functionality, and operation of possible implementations of systems, methods and computer program products according to various embodiments of the invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, various embodiments of the invention can include a system, method or computer program product. Accordingly, the invention can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the invention can take the form of a computer program product embodied in any tangible medium of expression having computer-usable program code embodied in the medium.

Any combination of one or more computer usable or computer readable medium(s) can be used. The computer-usable or computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium can be any medium that can contain, store, communicate, propagate, or transport the program for use by or in connection with the instruction execution system, apparatus, or device. The computer-usable medium can include a propagated data signal with the computer-usable program code embodied therewith, either in baseband or as part of a carrier wave. The computer usable program code can be transmitted using any appropriate medium, including but not limited to wireless, wireline, optical fiber cable, RF, and so on.

Computer program code for carrying out operations of the invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

A number of implementations of the invention have been described. Nevertheless, it will be understood that various modifications may be made without departing from the spirit and scope of the invention. For example, the above examples have focused on individual telephone numbers, but the same techniques can be applied to groups of telephone numbers. These groups can include individual contacts selected by a user, or apply to a particular area code, or to e-mails sent to any address within a particular domain. Rules can then be specified by the user for the group as a whole, which will then apply to all the members of the group. The privacy features described above, and also be specified for a particular time of day, for example, so that all calls made after 10 p.m. are marked as private, and so on.

It should also be noted that while the above discussion has focused on mobile telephones, the above techniques are equally applicable to other types of communication devices, such as conventional land line telephones, and so on. There are also other types of communications in addition to the e-mails, phone calls and text messages discussed above, such as video mails, which are becoming increasingly more popular. The above techniques are equally applicable to such communication types. Accordingly, other embodiments are within the scope of the following claims.

The invention claimed is:

1. A computer-implemented method for keeping confidential records pertaining to a subset of selected communications among all communications made with a mobile communication device, the method comprising:

receiving a user input designating a subset of contacts among all the contacts stored in the communication device with whom all future communications made with the mobile communication device are to remain confidential;

storing the designated subset of contacts in a local private contact list on the mobile communication device wherein the local private contact list includes names of one or more users identified by telephone numbers or e-mail addresses;

transmitting the local private contact list from the mobile communication device to a server storing records pertaining to communications made with the mobile communication device;

automatically synchronizing the transmitted local private contact list with a corresponding server private contact list stored on the server; and generating, by the server, an online version of a billing statement for the communications made with the communication device based on information stored on the server and checking against the server private contact list for the one or more users, wherein records pertaining to communications made with contacts in the server private contact list are displayed as an alias on the statement, and different viewing rights are associated with the different types of identities of the one or more users wherein the records are displayed as aliases based on a user identifier type that was used when logging onto the server to view the online billing statement.

2. The method of claim 1, wherein the communications pertain to one or more of: telephone calls made or received with the communication device, e-mails sent from or received by the communication device, video mails sent from or received by the communication device, and text messages sent from or received by the communication device.

3. The method of claim 1, wherein receiving a user input designating a subset of contacts includes receiving a user input specifying one or more of: a set of telephone numbers, a set of e-mail addresses, and a set of contacts listed in the communication device.

4. The method of claim 1, wherein the alias is one of: a record having a fake name or number designated by the user, a record having the same name or number as a previous record on the statement, and a record being marked as private.

5. A computer program product for keeping confidential records pertaining to a subset of selected communications among all communications made with a mobile communication device, the computer program product comprising:
- a non-transitory computer readable storage medium having computer readable program code embodied therewith, the computer readable program code comprising:
- computer readable program code configured to receive a user input designating a subset of contacts among all the contacts stored in the communication device with whom all future communications made with the mobile communication device are to remain confidential;
- computer readable program code configured to store the designated subset of contacts in a local private contact list on the mobile communication device wherein the local private contact list includes names of one or more users identified by telephone numbers or e-mail addresses;
- computer readable program code configured to transmit the local private contact list from the mobile communication device to a server storing records pertaining to communications made with the mobile communication device;
- computer readable program code configured to automatically synchronize the transmitted local private contact list with a corresponding server private contact list stored on the server; and
- computer readable program code configured to generate, by the server, an online version of a billing statement for the communications made with the communication device based on information stored on the server and checking against the server private contact list for the one or more users, wherein records pertaining to communications made with contacts in the server private contact list are displayed as an alias on the statement, and different viewing rights are associated with the different types of identities of the one or more users wherein the records are displayed as aliases based on a user identifier type that was used when logging onto the server to view the online billing statement.

6. The computer program product of claim 5, wherein the communications pertain to one or more of: telephone calls made or received with the communication device, e-mails sent from or received by the communication device, video mails sent from or received by the communication device, and text messages sent from or received by the communication device.

7. The computer program product of claim 5, wherein the computer readable program code configured to receive a user input designating a subset of contacts includes computer usable program code configured to receive a user input specifying one or more of: a set of telephone numbers, a set of e-mail addresses, and a set of contacts listed in the communication device.

8. The computer program product of claim 5, wherein the alias is one of: a record having a fake name or number designated by the user, a record having the same name or number as a previous record on the statement, and a record being marked as private.

9. A system for keeping confidential records pertaining to selected communications made with a communication device, the system comprising:
- a mobile communication device operable to:
  - receive a user input designating a subset of contacts among all the contacts stored in the communication device with whom all future communications made with the mobile communication device are to remain confidential; and
  - store the designated subset of contacts in a local private contact list on the mobile communication device wherein the local private contact list includes names of one or more users identified by telephone numbers or e-mail addresses;
- a server operable to:
  - receive information from the mobile communication device about the designated one or more contacts;
  - store records pertaining to communications made with the mobile communication device; and
  - automatically synchronize the transmitted local private contact list with a corresponding server private contact list stored on the server; and
- a computing device operable to:
  - generate an online version of a billing statement for the communications made with the communication device based on information stored on the server and checking against the server private contact list for the one or more users, wherein records pertaining to communications made with contacts in the server private contact list are displayed as an alias on the statement, and different viewing rights are associated with the different types of identities of the one or more users wherein the records are displayed as aliases based on a user identifier type that was used when logging onto the server to view the online billing statement.

10. The system of claim 9, wherein the communications pertain to one or more of: telephone calls made or received with the communication device, e-mails sent from or received by the communication device, video mails sent from or received by the communication device, and text messages sent from or received by the communication device.

11. The system of claim 9, wherein receiving a user input designating a subset of contacts includes receiving a user input specifying one or more of: a set of telephone numbers, a set of e-mail addresses, and a set of contacts listed in the communication device.

12. The system of claim 9, wherein the alias is one of: a record having a fake name or number designated by the user, a record having the same name or number as a previous record on the statement, and a record being marked as private.

* * * * *